United States Patent
Heller et al.

(10) Patent No.: US 6,910,744 B2
(45) Date of Patent: Jun. 28, 2005

(54) CONTROL DEVICE FOR COMPRESSED-AIR BRAKES

(75) Inventors: Martin Heller, Unterschleissheim (DE); Benno Wenk, Wolnzach (DE); Stefan Sonntag, Taufkirchen (DE)

(73) Assignee: Knorr-Bremse Systeme für Schienenfahrzeuge GmbH, Munich (DE)

( * ) Notice: Subject to any disclaimer, the term of this patent is extended or adjusted under 35 U.S.C. 154(b) by 170 days.

(21) Appl. No.: 10/215,043

(22) Filed: Aug. 9, 2002

(65) Prior Publication Data

US 2003/0038540 A1 Feb. 27, 2003

(30) Foreign Application Priority Data

Aug. 13, 2001 (DE) .......................................... 101 39 773

(51) Int. Cl.[7] .............................................. B60T 10/00
(52) U.S. Cl. .............................. 303/28; 303/27; 303/40
(58) Field of Search ............................. 303/25, 26, 27, 303/28, 33, 35, 36, 37, 38, 40, 43, 57, 69

(56) References Cited

U.S. PATENT DOCUMENTS

| | | | | |
|---|---|---|---|---|
| 2,714,534 A | * | 8/1955 | Keller ........................ | 303/38 |
| 4,561,700 A | * | 12/1985 | Goritz et al. ................. | 303/36 |
| 4,575,158 A | * | 3/1986 | Grunert et al. ............... | 303/57 |
| 4,592,598 A | * | 6/1986 | Hintner ...................... | 303/37 |

FOREIGN PATENT DOCUMENTS

| | | | |
|---|---|---|---|
| DE | 600 986 | | 8/1934 |
| DE | 816 410 | | 10/1951 |
| DE | 919234 | * | 10/1954 |
| DE | 1108 257 | | 6/1961 |
| DE | 0 133 653 | | 5/1986 |
| FR | 1.054.327 | | 2/1954 |
| FR | 1.295.788 | | 6/1962 |
| GB | 751070 | * | 6/1956 |
| GB | 751935 | * | 7/1956 |
| GB | 989063 | | 4/1965 |
| NL | 77519 | | 3/1955 |

OTHER PUBLICATIONS

Knorr–Bremse Systems for Rail Vehicles Manual, "Distributor Valve KEd", B–EC00.25–en, Rev. 00.

* cited by examiner

Primary Examiner—Jack Lavinder
Assistant Examiner—Bradley King
(74) Attorney, Agent, or Firm—Barnes & Thornburg LLP

(57) ABSTRACT

The invention relates to a control device for compressed-air brakes having a control valve, comprising a housing, a piston rod, a piston, a second piston, a double-seat valve, having a control element, having a supply air reservoir, having a control chamber, having a main air pipe; one side of the piston being connected in a compressed-air carrying manner with the main air pipe; the other side of the piston being connected in a compressed-air carrying manner with the control chamber; one side of the second piston having a compressed-air connection to a brake cylinder or a brake cylinder pilot chamber; the double-seat valve being connected between a compressed-air connection of the supply air reservoir and the compressed-air connection to the brake cylinder or to the brake cylinder pilot chamber.

The invention is characterized by the following features:

A compressed-air connection from the main air pipe to the double-seat valve is connected parallel to the compressed-air connection from the supply air reservoir;

a valve comprising a piston rod and a piston is connected into the parallel compressed-air connection;

on one side, the piston has a compressed-air connection device for a control pressure;

on the other side, the piston has a device for generating a counterforce, particularly a pressure spring;

a control element is connected into the connection point between the main air pipe, the control chamber, the compressed-air connection device for the control pressure, the brake cylinder or the brake cylinder pilot space and the environment.

10 Claims, 3 Drawing Sheets

US 6,910,744 B2

CONTROL DEVICE FOR COMPRESSED-AIR BRAKES

BACKGROUND AND SUMMARY OF THE INVENTION

The invention relates to a control device for compressed-air brakes.

Compressed-air brakes are used, for example, in the case of rail vehicles, where the braking operation is initiated by lowering the pressure in a main air pipe. This is provided for safety reasons but means that a control device is required which ensures that, when the pressure is lowered in the main air pipe, a pressure rise takes place in the brake cylinders. Such a control device is described, for example, in European Patent Document EP 0 133 653 B1.

Because of their complexity, such control devices should have a certain size. As illustrated, for example, in Specification B-EC00.25, Picture 5 and 6, a control sleeve 101.37, a minimum pressure limiting device F and a Ü-monitor U with the Ü-chamber K are provided. These are three structural components which together represent certain constructional expenditures, particularly the position of the control sleeve in the piston rod of the triple-pressure element G influencing the size of the overall control valve. The influence is caused, on the one hand, directly by the size of the control sleeve which has an effect on the height of the housing, but also indirectly because, for operating the control sleeve and overcoming the friction of the sliding sealing caused by the control sleeve, a certain size of the diaphragm disk 101.21 is required.

The present invention provides a control device at reduced expenditures and of a smaller size. Furthermore, when automatic brakes are used, a braking of all cars which is as simultaneous and uniform as possible is to be achieved by means of the control device.

The idea on which the present invention is based is that of omitting one of three structural components as known from the prior art—the control sleeve, the minimum pressure limiting device and the Ü-monitor—without reducing functionality. The reason is that the control sleeve surprisingly becomes superfluous when the main air pipe is successfully connected in a meaningfully time-controlled manner to valve V 101.2. The control of this connection takes place by a valve whose position corresponds approximately to the minimal pressure limiting device F. An especially constructed control element is required which combines in itself the function of the Ü-monitor and of the A-monitor D of the known control device.

As a result of the present invention, the size of the control device can be reduced by approximately 50% in comparison to the known control device while the hysteresis of the device, does not exceed the normal value.

According to the present invention, the control device has a control valve in a housing. The control valve includes a piston rod with a first and second piston and a double-seat valve. Furthermore, the present invention comprises a control element, a supply air reservoir, a control chamber and a main air pipe. One side of the first piston is connected with the main air pipe in a compressed-air carrying manner, and the other side is connected with the control chamber in a compressed-air carrying manner. On one side, the second piston is connected in a compressed-air carrying manner with a brake cylinder pilot chamber or a brake cylinder, while an ambient pressure exists on the other side. The double-seat valve is connected between a compressed-air connection to the supply air reservoir and a compressed-air connection to the brake cylinder pilot chamber. The control device further includes a compressed-air connection from the main air pipe connected in parallel to the compressed-air connection from the supply air reservoir to the double-seat valve. The compressed-air connection from the main air pipe is connected to a valve that comprises a piston rod and a piston. On one side, the piston has a compressed-air connection for a control pressure and, on the other side, the piston has a device for generating a counterforce, preferably in the form of a pressure spring. The control device further includes a control element connected to the main air pipe, the control chamber, the compressed-air connection for the control pressure, the brake cylinder pilot chamber and the environment.

The second piston of the double-seat valve is connected on its second side with the environment, or ambient air, such that, in the case of a lower position of the piston rod with the two pistons, the brake cylinder pilot chamber is vented by way of the ambient air connection. In this case, in this lower position, the double-seat valve has one seat closed so that the compressed-air connection of the connection pipe from the supply air reservoir to the double-seat valve—or the pipe connected parallel thereto—is separated from the brake cylinder pilot chamber. In an upper position of the piston rod with the two pistons, the double-seat valve has one seat opened; the brake cylinder pilot chamber is separated from the environment by the second piston, so that compressed air can flow by way of the double-seat valve into the brake cylinder pilot chamber.

In an embodiment of the present invention, the double-seat valve is constructed as a tappet valve and is loaded in the closing direction by a pressure spring and in the opening direction by the piston rod of the control valve. In another embodiment of the present invention, the valve which controls the connection between the main air pipe and the double-seat valve is constructed as a tappet valve. This tappet valve can also be loaded by its pressure spring in the closing direction and in the opening direction by its piston rod.

In an embodiment of the present invention, the control element comprises a piston rod with an axial bore, a piston, a partition, a second partition and a valve. In the piston rod, a bypass is constructed for bridging the partition. On the side of the piston facing the valve, a compressed-air connection to the brake cylinder pilot chamber is constructed and, on the side of the piston facing away from the valve, a device is arranged for generating a counterforce, which device may be in the form of a pressure spring. The compressed-air connection for the control pressure can be connected by way of the valve with the main air pipe. The piston rod is arranged such that it leads from the valve through the two partitions to the piston. On the side of the partition facing the valve, a connection is constructed for the compressed-air connection with the control pressure; on the side facing away from the valve, the compressed-air connection is connected to the control chamber. The compressed-air connection to the brake cylinder pilot chamber is separated by the second partition from the compressed-air connection to the control chamber.

In an embodiment of the present invention, the effect of the pressure build-up and of the pressure reduction in the brake cylinder pilot chamber can be intensified in that a compressed-air carrying connection to another valve—for the purpose of a differentiation called a venting valve—is inserted in the connection line between the control valve and the brake cylinder pilot chamber, which venting valve opens and closes with respect to the environment. In addition, the venting valve will open up the passage to the environment when the brake cylinder pilot chamber, by way of the ambient air connection in the control valve, is vented at a lower position of the piston rod with the two pistons. The venting valve is therefore also constructed as a tappet valve. It is loaded at least indirectly in the opening direction by the control pressure and in the closing direction by a pressure spring. The venting valve may have essentially the same construction as the valve in the parallel pipe connecting the supply air reservoir and the double seat valve to the main air pipe. The venting valve may have a piston—loaded on one side by the control pressure and on the other side by a device for generating a counterforce, such as a pressure spring. The valve may also have a piston rod which, at a correspondingly high control pressure, presses open the valve that is held closed by the pressure spring thus opening up the connection of the brake cylinder pilot chamber to the environment.

An additional valve and/or a throttle or a choke may also be connected into the compressed-air connection between the supply air reservoir and the double-seat valve. Furthermore, the compressed-air connection from the main air pipe through the control element to the control chamber may be constructed to have particular pressure losses, particularly as a result of the design of the control element's bypass having a narrow flow cross-section. In addition, a valve and/or a throttle screen may be connected into the compressed-air connection between the control element and the control chamber.

Other aspects and novel features of the present invention will become apparent from the following detail description of the invention when considered in conjunction with the accompanying drawings.

DETAILED DESCRIPTION OF THE PREFERRED EMBODIMENTS

Figure 1:
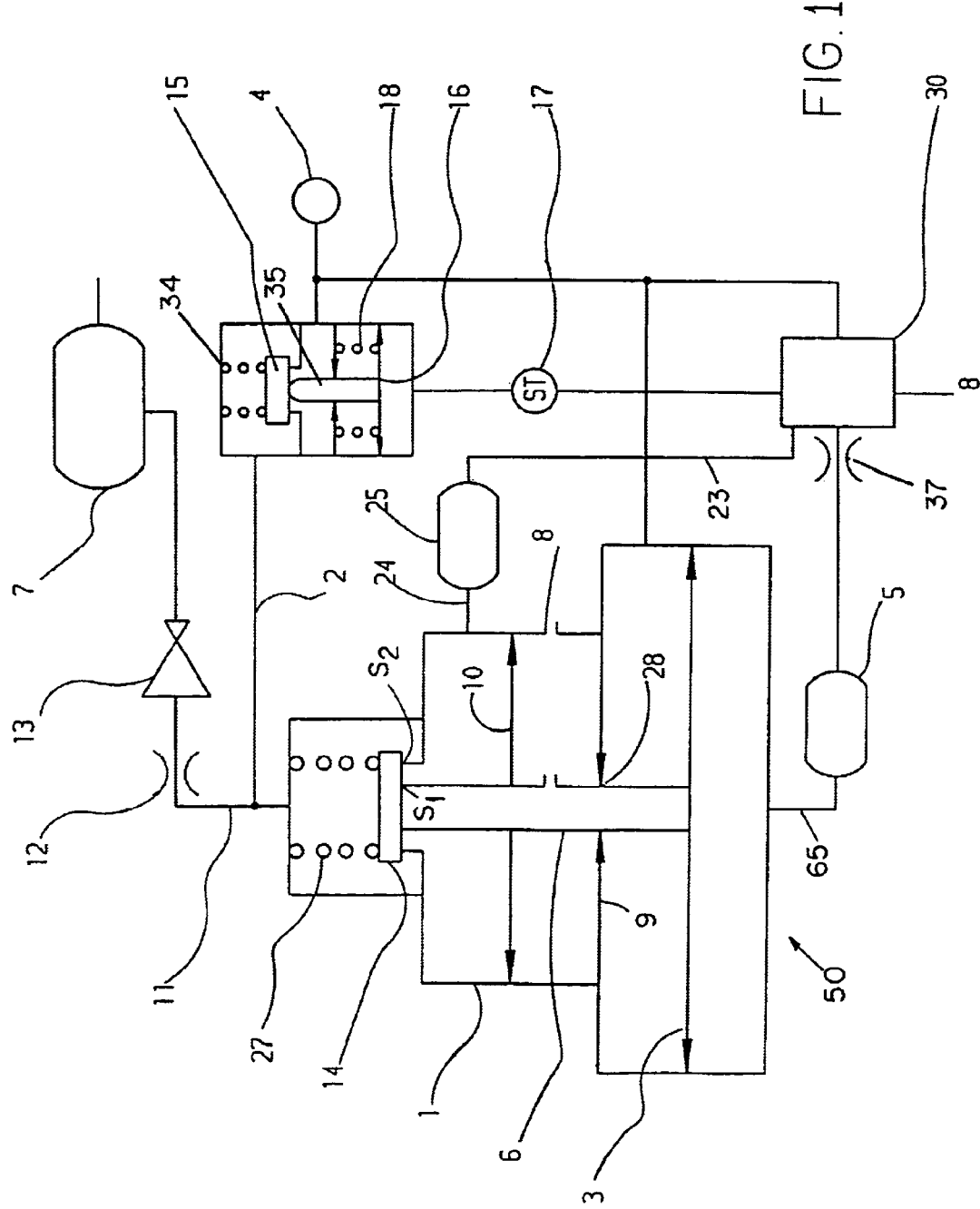
FIG. 1 is a schematic of an embodiment of a control device, according to the present invention.

FIG. 1 shows a control valve 50 having a housing 1 in which a piston rod 6, a first piston 3, a second piston 10 and a double-seat valve 14, with seats $S_1$ and $S_2$, are arranged. One side of the first piston 3 is connected by way of a compressed-air connection 11 with a main air pipe 4; the other side of the first piston 3 is connected by way of a compressed-air connection 65 to a control chamber 5. On one side, the second piston 10 is connected by way of a compressed-air connection 24 with a brake cylinder (not shown) or a brake cylinder pilot chamber 25. The other side of the second piston 10 is connected by way of bore 8 with the environment, or ambient air. Adjacent pressure spaces 3a, 10a of the pistons 3 and 10, respectively, are separated by a partition 9 through which the piston rod 6 is guided by a sliding sealing device 28.

The double-seat valve 14 is loaded by pressure spring 27 in a closing direction and by the piston rod 6 in an opening direction. The side of the double-seat valve 14 facing away from the second piston 10 has a connection device for compressed-air connection 11 to supply air reservoir 7. A valve 13 and a throttle 12 are connected into compressed-air connection 11. A compressed-air connection 2, connected in parallel to the compressed-air connection 11, connects valve 15 with the double seat valve 14. The valve 15 is constructed as a tappet valve loaded in a closing direction by pressure spring 34 and in an opening direction by piston rod 35. Piston 16 is arranged on the side of piston rod 35 facing away from valve 15 and is loaded by pressure spring 18 on a side of the piston 16 facing the valve 15; the other side of the piston 16 is connected with a compressed-air connection of control pressure 17. In this embodiment, the valve 15 is connected into the compressed-air connection 2 from the main air pipe 4 to the double-seat valve 14.

Control element 30 is connected to compressed-air pipes of the control chamber 5 and the brake cylinder pilot chamber 25, the main air pipe 4, the compressed-air connection of the control pressure 17 and the environment 8.

Figure 2:
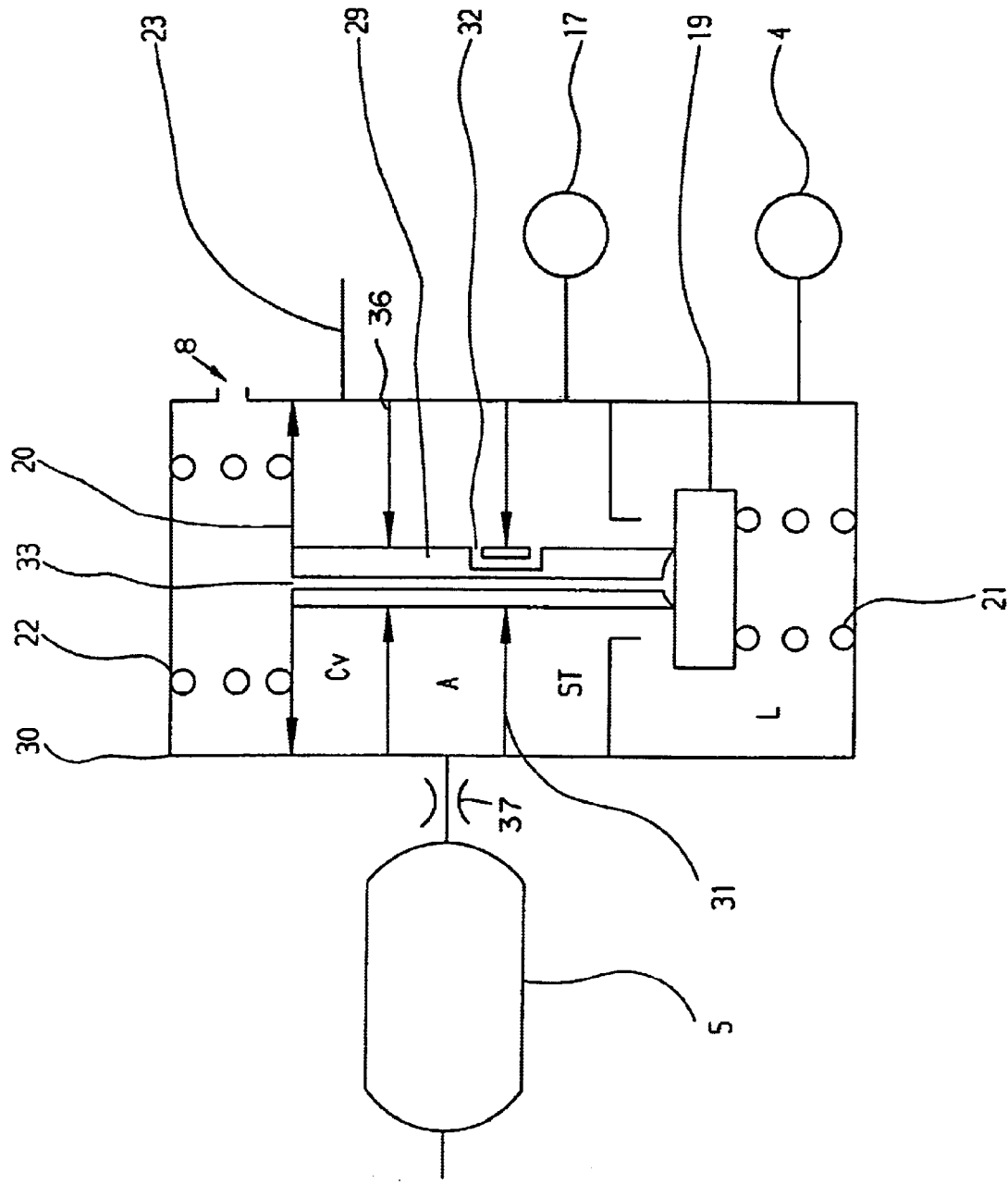
FIG. 2 is a schematic of an embodiment of the control element shown in FIG. 1.

As shown in FIG. 2, the control element 30 has a piston rod 29 with an axial bore 33 which is connected with a piston 20 on one side and with a piston valve 19 on the other side. The piston valve 19, in turn, is constructed as a tappet valve, loaded by a pressure spring 21 in a closing direction and by the piston rod 29 in an opening direction. On its side facing away from the valve 19, the piston 20 is loaded by a pressure spring 22 and is acted upon by ambient pressure by way of a bore 8.

By piston valve 19, partition 31, second partition 36 and the piston 20, the control element 30 is divided into five pressure spaces L, ST, A, $C_v$ and B. Each pressure space has a connection device for a compressed-air connection or a connection to ambient air. Viewed in an axial direction from the piston valve 19 to the piston 20, these are the connections to the main air pipe 4, to the compressed-air connection device for the control pressure 17, to the control chamber 5, to the brake cylinder pilot chamber 25 and to the environment at bore 8. In a suitable position of the piston rod 29, a bypass 32 in the piston rod 29 connects the pressure space ST with the compressed-air connection device of the control pressure 17 and through the pressure space A with the connection device of the compressed-air connection to the control chamber 5. When the valve 19 is open, the pressure space L, with the connection device for the main air pipe 4, is connected with the pressure space ST.

A throttle or choke 37 is connected into the compressed-air connection between the control element 30 and the control chamber 5.

Figure 3:
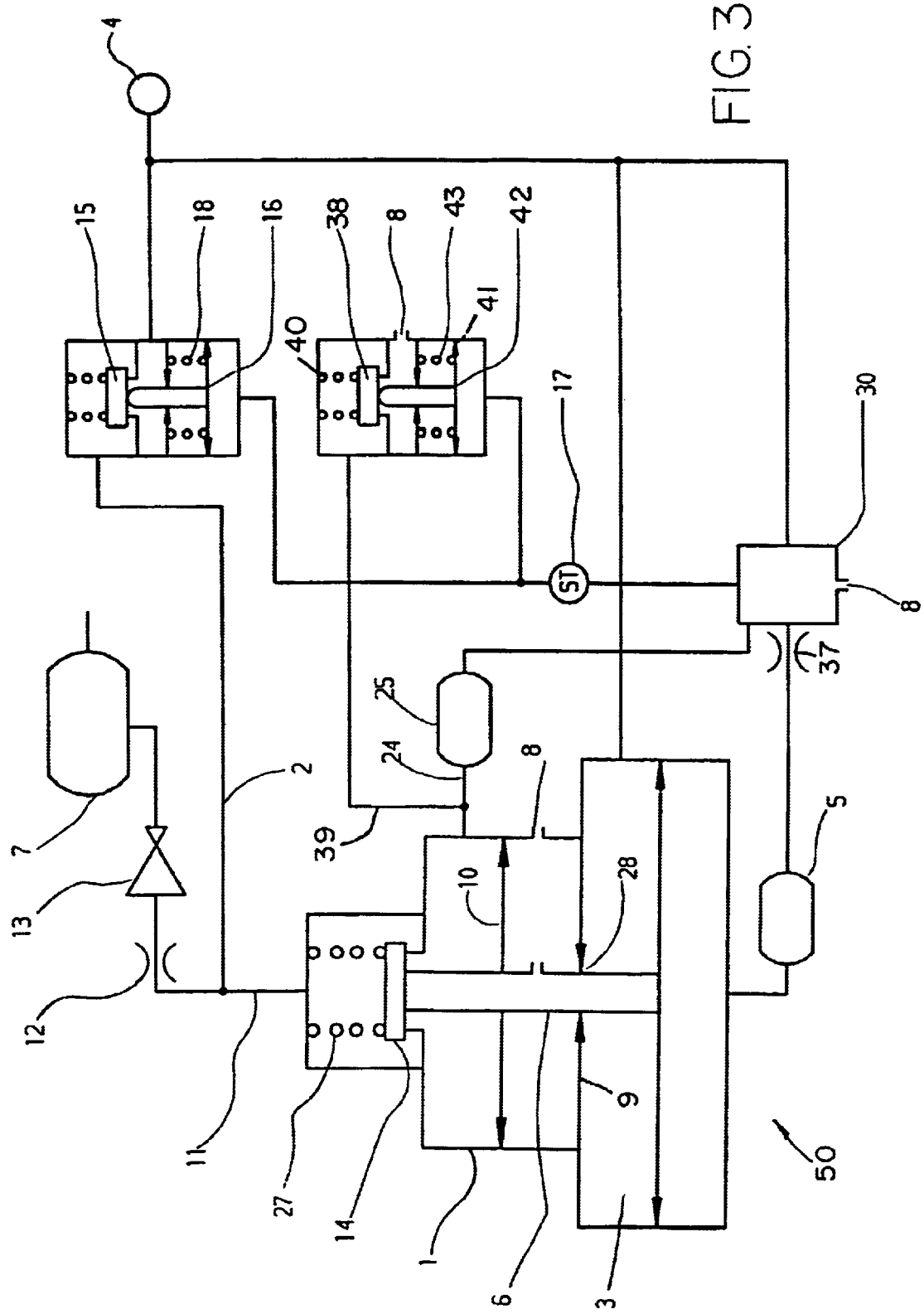
FIG. 3 is a schematic of an embodiment of a control device having a venting valve, according to the present invention.

FIG. 3 shows an embodiment having a venting valve 38 for intensifying a pressure build-up and pressure reduction in the brake cylinder pilot chamber 25. The venting valve 38 is connected by way of the compressed-air connection 39 with the compressed-air connection 24 between the control valve 50 and the brake cylinder pilot chamber 25. In an open condition, the venting valve 38 connects the brake cylinder pilot chamber 25 and ambient bore 8. In a closing direction, the venting valve 38 is loaded by pressure spring 40 and, in an opening direction, by piston 41 acted upon by control pressure 17 and piston rod 42. In the closing direction, the piston 41 is loaded by pressure spring 43.

A method of operation of the control device 30 during a braking operation is described using FIGS. 1 and 2.

In a lap position of control valve 50, as shown in FIG. 1, double-seat valve 14 has seats $S_1$ and $S_2$ both closed.

In a ready position of the control valve 50, piston rod 6, with the pistons 3 and 10, is in a lower position (not shown), in which the double-seat valve 14, with seats $S_1$ open and seat $S_2$ closed, keeps closed the compressed-air connection of the air connections 11 and 2 to the brake cylinder pilot chamber 25 and keeps the brake cylinder pilot chamber 25 vented through bore 8. Since, as a result, the pressure Cv (see FIG. 2) is zero or sufficiently low, the piston 20 is in a lower position because of the effect of the pressure spring 22. The piston valve 19 and the bypass 32 are open, and the main air pipe 4, the control chamber 5 and the compressed-air connection of the control pressure 17 are filled to a common normal operating pressure because the pressure chambers L, ST and A are connected in a compressed-air carrying manner.

Because of the effect of the control pressure 17 upon the piston 16, the valve 15 is opened up so that the main air pipe 4 is connected with the compressed-air connection 2, and the pressure from the main air pipe 4 is applied to the double-seat valve 14. In this case, the pressure in the compressed-air connection 2 is determined by the pressure in the main air pipe 4 because this pressure is higher in the ready position of the control valve 50 than the pressure which would occur only as a result of the pressure in the supply air reservoir 7 throttled by the valve 13 and the throttle 12 in the compressed-air connection 11 or 2. An unintended return flow from the compressed-air connection 2 by way of the compressed-air connection 11 into the supply air reservoir 7 can be avoided by a suitable construction of the valve 13. The pressure in the supply air reservoir 7 can be proportioned such that, after the throttling by way of the valve 13 and the throttle 12, a constant pressure of, for example, approximately 3.8 bar may occur in the compressed air connection 11, as long as this pressure is not determined by a higher pressure in the main air pipe, for example, by approximately 5 bar in the ready position.

A method of operation of the braking can be divided into two phases. In phase 1, the pressure in the main air pipe 4 is reduced for the braking. This reduction may take place slowly, for example, by approximately 0.1 bar per second. Since, preferably according to the present invention, the bypass 32 has a narrow cross-section, the pressure in the pressure chamber A and thus in the control chamber 5 can follow the main air pipe 4 pressure reduction only in a time-delayed manner. This delayed effect can be reinforced by throttle 37 inserted between the control element 30 and the control chamber 5. If desired, a valve may also be inserted.

The resulting pressure difference at the piston 3 has the result that the piston rod 6 is moved upward. The piston 10 thereby interrupts the connection of the brake cylinder pilot chamber 25 to the ambient bore 8, and the double-seat valve 14 opens up. That is, seat $S_1$ closes and seat $S_2$ opens.

Now the compressed air flows from the connection 2 into the brake cylinder pilot chamber 25. Because the connection by way of the valve 15 to the main air pipe 4 is still open, compressed air flows from the main air pipe 4 into the brake cylinder pilot chamber 25. The initiation of the braking therefore causes a self-intensifying lowering of the pressure in the main air pipe 4.

At the start of the braking, a pressure is provided for filling the brake cylinder pilot chamber 25 which is higher than the pressure normally provided by the supply air reservoir 7. That, in combination with the self-intensifying pressure reduction in the main air pipe 4, may provide for a fast propagation of a pneumatic brake signal from an engine to an end of a train (not shown), and a uniform braking force of all cars can be achieved.

The pressure in the brake cylinder pilot chamber 25 developing in phase 1 causes a movement of the piston 20 against the force of the pressure spring 22. In phase 2, the bypass 32 therefore first slides over the sliding partition 31. Immediately afterwards, the valve 19 closes the connection of the pressures L and ST. Simultaneously, a lowering of the pressure ST starts by the flowing-out of compressed air by way of the bore 33 in the piston rod 29.

After a certain time, the pressure in the chamber ST has dropped so far that the piston 16 is moved downward by the pressure spring 18, and the valve 15 separates the main air pipe 4 from the compressed-air connection 2. As a result, a flowing-over of compressed air from the main air pipe 4 into the brake cylinder pilot chamber 25 is concluded; a subsequent lowering of the pressure in the main air pipe 4 to a full brake application or rapid braking is not further intensified by the flowing out of air by way of the valve 15. Since the double-seat valve 14 remains open ($S_2$ open, $S_1$ closed), the pressure in the compressed-air connections 2 and 11 will drop to a pressure level provided by the supply air reservoir 7, for example, to approximately 3.8 bar. A filling rate of the brake cylinder pilot chamber 25 can therefore be adjusted by way of the valve 13 or the throttle 12.

A further lowering of the pressure in the main air pipe 4 to a full brake application or a rapid braking, for example, to approximately 3.5 bar or to 0 bar, leads to an increase of the pressure difference above the piston 3. As a result of the displacement of the piston rod 6, the double-seat valve 14 is opened up correspondingly far, and the brake cylinder pilot chamber 25 is filled further.

According to the present invention, it therefore becomes possible for the first time to provide a control device 30, for compressed-air brakes which requires low constructional expenditures and has a small size. When used for automatic brakes, the construction of the control device 30, according to the present invention, results in a high penetration speed because of reaction to a pressure build-up in a brake cylinder (not shown) or in the brake cylinder pilot chamber 25 from the pressure in the main air pipe 4, resulting in a simultaneous braking effect in all cars. By a pressure increase in the brake cylinders which is fast at first and then slower, a uniform braking force is achieved for all cars.

Although the present invention has been described and illustrated in detail, it is to be clearly understood that this is done by way of illustration and example only and is not to be taken by way of limitation. The spirit and scope of the present invention are to be limited only by the terms of the appended claims.

We claim:

1. A control device for compressed air brakes comprising:
a control valve having a housing, a control valve piston rod, a first piston, a second piston and a double seat valve;
a supply air reservoir having a compressed air connection to the double seat valve;
a main air pipe having a compressed air connection to the double seat valve connected in parallel to the compressed air connection of the supply reservoir to the double seat valve;
a control chamber connected between the control valve and a control element;
a first valve having a valve piston rod and a piston, and connected with the control valve via a compressed air connection, and the piston having, on one side, a pressure spring and, on the other side, having a compressed air connection device for a control pressure;
the first piston having one side connected with the main air pipe in a compressed-air carrying manner and the other side connected with the control chamber in a compressed air carrying manner;

the second piston having one side with a compressed air connection to one of a brake cylinder and a brake cylinder pilot chamber;

the double seat valve being connected between the compressed air connection at the supply reservoir and the compressed air connection to the brake cylinder pilot chamber; and the control element connected to the main air pipe, the control chamber, the compressed air connection device for the control pressure, the environment and one of the brake cylinder and the brake cylinder pilot chamber.

2. The device according to claim 1, wherein the double-seat valve is constructed as a tappet valve loaded in a closing direction by a pressure spring and in an opening direction by the control valve piston rod.

3. The device according to claim 1, wherein the first valve is constructed as a tappet valve loaded in a closing direction by the pressure spring and in an opening direction by the valve piston rod.

4. The device according to claim 1, wherein one or more of a valve and a throttle is connected into the compressed-air connection of the supply air reservoir.

5. The device according to claim 1, wherein a compressed-air connection from the main air pipe through the control clement to the control chamber has pressure losses, and since the control element has a bypass with a narrow flow cross-section, a pressure drop in the main air pipe is followed in a time-delayed manner by a pressure drop in the control chamber.

6. The device according to claim 1, wherein one or more of a valve and a throttle is connected into the connection between the control element and the control chamber.

7. The device according to claim 1, wherein a compressed-air connection with a venting valve is connected between the environment and the compressed-air connection that connects the control valve and the brake cylinder pilot chamber.

8. The device according to claim 7, wherein the venting valve is constructed as a tappet valve loaded in an opening direction at least indirectly by the control pressure.

9. The device according to claim 1, wherein the control element comprises:

a piston valve connected between the compressed air connection device for the control pressure and the main air pipe;

a piston having a compressed air connection to one of the brake cylinder and the brake cylinder pilot chamber on a side of the piston facing the piston valve, and a pressure spring on the side of the piston facing away from the piston valve;

a first partition having a connection device to a compressed air connection with the control pressure on a side of the first partition facing the piston valve and a compressed air connection to the control chamber on a side of the first partition facing away from the piston valve;

a second partition separating a compressed air connection to one of the brake cylinder and the brake cylinder pilot chamber and the compressed air connection to the control chamber; and a piston rod having an axial bore and a bypass for bridging of the first partition, and the piston rod leading from the piston valve through the first partition and the second partition to the piston.

10. The device according to claim 9, wherein the piston valve is constructed as a tappet valve loaded in a closing direction by a pressure spring and in an opening direction by the piston rod.

* * * * *